United States Patent
Bruls

(10) Patent No.: US 9,325,964 B2
(45) Date of Patent: Apr. 26, 2016

(54) 3D VIDEO FORMAT DETECTION

(75) Inventor: Wilhelmus Hendrikus Alfonsus Bruls, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 440 days.

(21) Appl. No.: 13/577,698

(22) PCT Filed: Feb. 2, 2011

(86) PCT No.: PCT/IB2011/050455
§ 371 (c)(1),
(2), (4) Date: Aug. 8, 2012

(87) PCT Pub. No.: WO2011/098936
PCT Pub. Date: Aug. 18, 2011

(65) Prior Publication Data
US 2012/0314028 A1    Dec. 13, 2012

(30) Foreign Application Priority Data
Feb. 9, 2010   (EP) .................................. 10152997

(51) Int. Cl.
*H04N 13/00*   (2006.01)
*H04N 19/597*  (2014.01)

(52) U.S. Cl.
CPC ......... *H04N 13/004* (2013.01); *H04N 13/0003* (2013.01); *H04N 13/007* (2013.01); *H04N 13/0059* (2013.01); *H04N 19/597* (2014.11); *H04N 13/0048* (2013.01); *H04N 2213/007* (2013.01)

(58) Field of Classification Search
USPC .......................................................... 348/43
See application file for complete search history.

(56) References Cited

U.S. PATENT DOCUMENTS

| 5,686,970 A | 11/1997 | Tani |
| 7,176,960 B1* | 2/2007 | Nayar et al. ............. 348/207.99 |
| 2004/0228409 A1* | 11/2004 | Ryou ....................... 375/240.12 |

(Continued)

FOREIGN PATENT DOCUMENTS

| EP | 1024672 A1 | 8/2000 |
| JP | 9271042 A | 10/1997 |
| JP | 10191394 A | 7/1998 |
| JP | 2005006114 A | 1/2005 |
| JP | 2006195018 A | 7/2006 |

(Continued)

OTHER PUBLICATIONS

Fern, Christoph "Depth-Image-Based Rendering (DIBR), Compression and Transmission for a New Approach on 3D-TV", SPIE-IS&T Electronic Imaging, SPIE vol. 5291, 2004, pp. 93-104.

*Primary Examiner* — Michael Teitelbaum

(57) ABSTRACT

A video signal is processed in a video device (50). The video signal transfers video data representing either three dimensional video [3D] content formatted according to a 3D format or 2D content formatted according to a 2D format. The video signal has a 2D frame and a control structure of a 2D format for being compatible with existing distribution systems. The device has a processor (52) for providing a 3D status signal indicative of the format of the video signal. The processor determines a respective format score for at least one of the possible 3D formats by processing the video data according to respective predetermined format properties for deriving and comparing respective 3D subframes, and sets the 3D status signal based on an assessment of the format score to indicate the format of the video signal. Advantageously the 3D format is detected automatically and a 3D display can be controlled accordingly.

13 Claims, 6 Drawing Sheets

(56) References Cited

U.S. PATENT DOCUMENTS

| | | |
|---|---|---|
| 2005/0117637 A1 | 6/2005 | Routhler |
| 2007/0035618 A1 | 2/2007 | Yoshida |
| 2007/0222855 A1 | 9/2007 | Krijn |
| 2008/0068497 A1* | 3/2008 | Lee et al. .................. 348/448 |
| 2008/0303893 A1 | 12/2008 | Kim |
| 2009/0315979 A1* | 12/2009 | Jung et al. ................ 348/43 |
| 2010/0321390 A1* | 12/2010 | Kim et al. ................ 345/427 |

FOREIGN PATENT DOCUMENTS

| | | |
|---|---|---|
| JP | 2006332985 A | 12/2006 |
| JP | 2008085540 A | 4/2008 |
| KR | 1020090025934 | 3/2009 |
| WO | 2006018773 A1 | 2/2006 |
| WO | 2008153294 A2 | 12/2008 |
| WO | 2009077929 A1 | 6/2009 |

* cited by examiner

3D VIDEO FORMAT DETECTION

FIELD OF THE INVENTION

The invention relates to a video device for processing a video signal, the device comprising receiving means for receiving the video signal comprising video data representing either three dimensional video [3D] content formatted according to a 3D format or two dimensional video [2D] content formatted according to a 2D format, the video signal having a 2D frame and a control structure of a 2D format, the 3D format having at least two 3D subframes for constituting a single 3D frame and being one of a set of possible 3D formats.

The invention further relates to a method of processing a video signal comprising receiving the video signal comprising video data representing either three dimensional video [3D] content formatted according to a 3D format or two dimensional video [2D] content formatted according to a 2D format, the video signal having a 2D frame and a control structure of a 2D format, the 3D format having at least two 3D subframes for constituting a single 3D frame and being one of a set of possible 3D formats.

The invention further relate to a video signal and a computer program product.

The invention relates to the field of transferring 3D video data via a 2D video data signal format.

BACKGROUND OF THE INVENTION

Devices for generating two dimensional (2D) video data are known, for example video servers, broadcasters, or authoring devices. Currently 3D enhanced devices for providing three dimensional (3D) image data are being proposed. Similarly video devices for processing display 3D video data are being proposed, like players for optical disc (e.g. Blu-ray Disc; BD) or set top boxes which render received digital video signals. The video device is to be coupled to a 3D display device like a TV set or monitor. Video data may be transferred from the device via a suitable interface, preferably a high-speed digital interface like HDMI. The 3D display may also be integrated with the video device, e.g. a television (TV) having a receiving section and a 3D display.

Document WO2009/077929 describes approaches that could be taken to transition between 2D and 3D. A 3D video signal has video information and associated playback information, the video information and associated playback information being organized according to a playback format. The video information may comprise a primary video stream for 2D display, and an additional information stream for enabling 3D display. The associated playback information comprises display information indicating the types of display possible. The display information is processed at the receiver to determine that both 2D display and 3D display are possible. A playback mode is set determining whether the video information should be displayed in 2D or 3D mode.

SUMMARY OF THE INVENTION

A problem of WO2009/077929 is that transitions between 3D and 2D playback are based on the availability of 3D signaling in the input video signal. However, 3D formats may be mapped on 2D format video signals to be compatible with existing distribution systems of video signals and/or storage media. Due to the lack of signaling in the existing 2D signal format, the user has to manually select the appropriate mode for rendering the video signal in 3D.

It is an object of the invention to provide a system for transitioning between 3D and 2D in a more convenient way.

For this purpose, according to a first aspect of the invention, the device as described in the opening paragraph, comprises a processor for providing a 3D status signal indicative of the format of the video signal, the processor being arranged for determining respective format scores for a number of the possible 3D formats by processing the video data according to respective predetermined format properties for deriving and comparing the respective 3D subframes, which determining said respective format scores for said number of the possible 3D formats is arranged in a predetermined order, and setting the 3D status signal based on an assessment of the respective format scores to indicate the format of the video signal, when the assessment of the respective format scores provides a predetermined level of confidence.

For this purpose, according to a further aspect of the invention, the method of processing a video signal comprises providing a 3D status indicative of the format of the video signal based on determining respective format scores for a number of the possible 3D formats by processing the video data according to respective predetermined format properties for deriving and comparing the respective 3D subframes, which determining said respective format scores for said number of the possible 3D formats is arranged in a predetermined order, and setting the 3D status based on an assessment of the respective format scores to indicate the format of the video signal, when the assessment of the respective format scores provides a predetermined level of confidence.

The measures have the following effect. The video signal arriving on the input is analyzed by the video device to determine a 3D status signal, the 3D status being either a 2D status or a 3D status indicating one format of a set of possible 3D video formats. The video device provides the 3D status signal for controlling a 3D video display, i.e. to set the operational mode for correctly rendering the video signal. The analyzing is based on determining a format score for the respective 3D formats, i.e. assuming that the signal contains video data according to the respective 3D video format the corresponding 3D subframes are derived from the signal. For example, both 3D subframes are allegedly arranged side by side in a 2D frame. Subsequently the 3D subframes, e.g. a left frame and a right frame, are derived from the signal and compared, i.e. analyzed to verify if both alleged 3D subframes indeed have the format properties of corresponding 3D subframes. For example, for an L and R frame a correlation is calculated, which should be relatively high because the same content is present in both 3D subframes albeit viewed from a slightly different viewing angle. Subsequently the format scores are assessed, e.g. compared to a predetermined threshold. Based on the assessment one of the 3D formats may have a reliably high score, and then the 3D status signal is correspondingly set to indicate the format of the video signal. If none of the 3D formats has a sufficiently high score, a 2D video signal is assumed and the status is correspondingly set. Advantageously the actual mode of a 3D display, e.g. a 3D television set, can be automatically controlled based on the 3D status signal.

The invention is also based on the following recognition. As consumers get used to viewing in 3D there will be a need to transfer video signals via existing distribution channels, e.g. broadcasting networks or video storage media. In practice, a minor degradation in resolution appears to be acceptable and content providers may package their 3D content in the existing 2D video signal formats by arranging the 3D subframes in the 2D frame. The inventors have seen that it is convenient to automatically detect such a specially formatted 3D signal, which cannot carry control data signaling the 3D format, because inherently the format of the video signal must remain the existing 2D format. Although various arrangements of the 3D subframes may be used, still a detection of the 3D format appears to be possible based on first assuming a respective 3D video format has been used and subsequently analyzing the alleged 3D subframes for that format. Advantageously, based on the current relative cheapness of video processing power, the analyses are possible in real time within a time short enough for the user to hardly notice the delay in switching to 2D or 3D video mode respectively.

In an embodiment the set of possible 3D formats comprises at least one spatial subsampling format for generating the 3D subframes and the predetermined format properties comprises arranging subsampled picture elements of the 3D subframes in the 2D frame of the video signal. Spatially subsampling reduced the number of pixels, i.e. the resolution, in one or more spatial directions. Advantageously the 3D subframes require a lower number of pixels and can be fitted in a (full resolution) 2D frame. The arrangements of spatially subsampled 3D subframes in various 3D formats (e.g. side by side or top/bottom) are assumed and a respective format score is calculated.

In an embodiment determining respective format scores for a number of 3D formats of the set of possible 3D formats is arranged in a predetermined order, and the 3D status signal is set when the assessment of the format scores provides a predetermined level of confidence. Advantageously a high score for a 3D format that is expected is found more quickly.

In an embodiment determining the respective format score comprises calculating a correspondence between the 3D subframes by at least one of calculating a correlation between the 3D subframes; calculating a mean average of differences between the 3D subframes; calculating color properties of the respective 3D subframes for detecting a depth data subframe. A correlation or having low mean average differences between both 3D subframes is expected for corresponding left and right 3D subframes, whereas color properties for a depth map as a 3D subframe are significantly different (usually depth data does not contain color).

In an embodiment at least one of the possible 3D formats comprises left and right 3D [L and R] subframes arranged in the 2D frame according to a left/right polarity, and the processor is arranged for, when determining the format score, determining a polarity score based on a predetermined distribution of depth occurring in the 3D frame, and setting the 3D status includes setting a left/right polarity status signal based on an assessment of the polarity score. The depth in the 3D frame may be derived from disparity values, actual depth values in a depth map, or a suitable estimation based on the 3D subframes. Detecting the presence of 3D subframes may also require detecting which subframe is left and which subframe is right. If the subframes are interchanged, a strong deformation of the depth information in the 3D image occurs. By assuming a predetermined distribution of depth values or corresponding disparity values, a polarity score is determined. Advantageously the 3D display will be provided with the correct left and right polarity status.

In an embodiment the processor has detector means for comparing the respective 3D subframes by at least one of detecting a vertical black matte at the vertical edges of the 3D subframes; detecting a horizontal black matte at the horizontal edges of the 3D subframes. Based on the presence of a black matte the respective 3D subframes can reliably be detected.

According to a further aspect of the invention, the video signal comprises video data representing either three dimensional video [3D] content formatted according to a 3D format or two dimensional video [2D] content formatted according to a 2D format, the video signal having a 2D frame and a control structure of a 2D format, the 3D format having at least two 3D subframes for constituting a single 3D frame and being one of a set of possible 3D formats, the video data having at least one of a vertical black matte at the vertical edges of the 3D subframes, while the video content aspect ratio does not require vertical black bars; a horizontal black matte at the horizontal edges of the 3D subframes, while the video content aspect ratio does not require horizontal black bars; for allowing detecting the black matte for determining the 3D format. Advantageously, based on the presence of the black matte, the respective 3D subframes can reliably be detected.

Further preferred embodiments of the method, video devices and signal according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

In the Figures, elements which correspond to elements already described have the same reference numerals.

DETAILED DESCRIPTION OF EMBODIMENTS

It is noted that the current invention may be used for any type of 3D display that has a depth range. Video data for the 3D displays is assumed to be available as electronic, usually digital, video data. The current invention relates to such image data and manipulates the image data in the digital domain.

There are many different ways in which 3D images may be formatted and transferred, called a 3D video format. Some 3D formats are based on using a 2D channel to also carry the stereo information. This document focuses on 3D formats using a 2D format signal to be compatible with existing 2D distribution.

Figure 1:
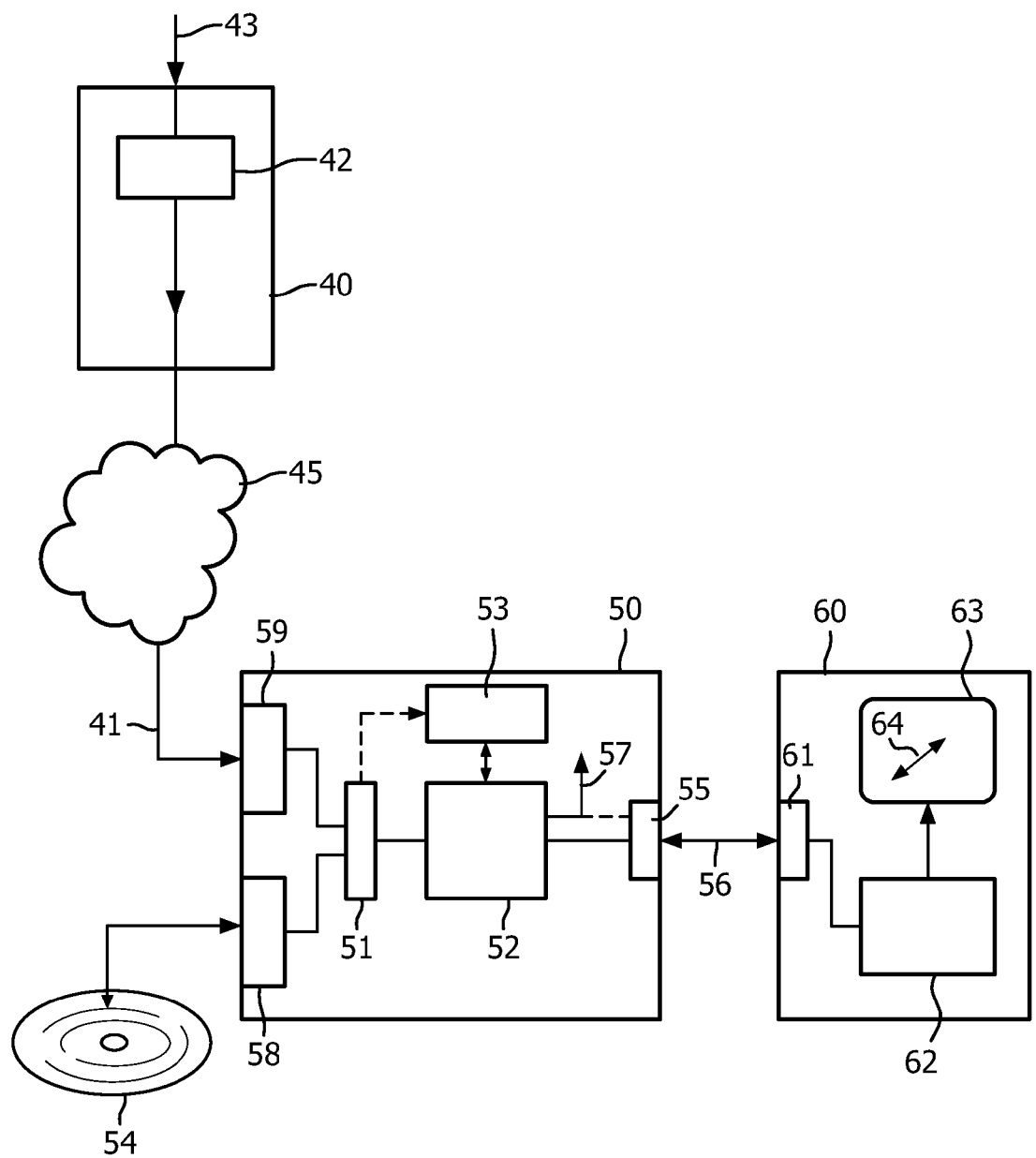
FIG. 1 shows a system for displaying 3D image data.

FIG. 1 shows a system for displaying three dimensional (3D) image data, such as video, graphics or other visual information. A source device 40 transfers a video signal 41 to a video device 50. The source device provides the video signal based on a video data input 43 available from a storage system, from 3D camera's, etc. The video signal 41 may be a 2D video signal or a 3D video signal. This document focuses on transferring 3D video content via a signal that is formatted according to a pre-existing 2D signal format, e.g. to be compatible with existing distribution channels. In such a 2D formatted video signal the 3D format defines the location and structure of 3D video data. Hence the video data represents either three dimensional video [3D] content formatted according to a 3D format or two dimensional video [2D] content formatted according to a 2D format. In particular, the video signal has a 2D frame and a control structure of a 2D format, whereas in the event of the 3D format being used, the video data has at least two 3D subframes for constituting a single 3D frame. Actually various different 3D formats are used, and the video signal contains the structure of one of a set of possible 3D formats. Various examples of 3D formats are discussed below with reference to FIGS. 2-5.

The source device may be a server, a broadcaster, a recording device, or an authoring and/or production system for manufacturing record carriers like the Blu-ray Disc. Blu-ray Disc supports an interactive platform for content creators. For 3D stereoscopic video there are many formats. The major formats are stereo and the image-plus-depth format. Of these again there are many possible ways in which the content can be formatted to be suitable for use with new and existing 3D displays and distribution formats. More information on the Blu-ray Disc format is available from the website of the Blu-ray Disc association in a paper on the audio-visual application format. http://www.blu-raydisc.com/Assets/Downloadablefile/2b_bdrom audiovisualapplication_030 5-12955-15269.pdf. The production process further comprises the steps of deriving the physical pattern of marks in the tracks which embodies the 3D video signal including the depth metadata, and subsequently shaping the material of the record carrier to provide the tracks of marks on at least one storage layer.

In an embodiment the source device has a processing unit 42 for modifying the video data of the 3D video input 43 to enhance the detection of the 3D video data that are transmitted via the 2D formatted video signal, as explained below.

The video device 50 is coupled to a 3D display device 60 for transferring a 3D display signal 56. The 3D video device has an input unit 51 for receiving the video signal. For example the device may include an optical disc unit 58 coupled to the input unit for retrieving the video signal from an optical record carrier 54 like a DVD or Blu-ray disc. Alternatively, the device may include a network interface unit 59 for coupling to a network 45, for example the internet or a broadcast network, such video device usually being called a set-top box. The video device may also be a satellite receiver, a media player, a personal computer, a mobile device, etc.

The video device has a processor 52 coupled to the input unit 51 for processing the video signal. The processor provides a 3D status signal 57 indicative of the format of the video signal. The 3D status is either a 2D status or a 3D status indicating one 3D format of a set of possible 3D video formats. The processor is arranged for determining a respective format score for at least one of the possible 3D formats by processing the video data according to respective predetermined format properties. The video signal is analyzed for calculating the format scores for the respective 3D formats, i.e. assuming that the signal contains video data according to the respective 3D video format the corresponding 3D subframes are derived from the signal. Thereto the processor derives the respective 3D subframes, and sets the 3D status signal based on an assessment of the format score to indicate the format of the video signal. The video device provides the 3D status signal for controlling a 3D video display, i.e. to set the operational mode for correctly rendering the video signal. An example embodiment of the processor 52 is described with reference to FIG. 6.

In an embodiment the video device has a detector 53 for detecting 3D format signal properties at the edges of the 3D subframes. For example, the detector may detect a vertical black matte at a vertical edge of the 3D subframes, or a horizontal black matte at a horizontal edge of the 3D subframes. Relatively broad black bars may be present in the video data due to a mismatch of the aspect ratio of the 2D frame and the active video area, e.g. a movie having an aspect ratio of 2.35:1 in a 16:9 video frame. Such broad black bars may be detected easily, e.g. in a top-bottom 3D format as explained below. As such, detecting broad black bars for detecting an aspect ratio is known, e.g. from U.S. Pat. No. 5,686,970.

The detector is coupled to the processor 52 for generating the 3D status signal, and may be physically integrated with the processor 52.

In an embodiment the video signal comprises video data representing either 3D content formatted according to a 3D format or 2D content formatted according to a 2D format, the video signal having a 2D frame and a control structure of a 2D format, the 3D format having at least two 3D subframes for constituting a single 3D frame and being one of a set of possible 3D formats, the video data having at least one of a vertical black matte at the vertical edges of the 3D subframes, while the video content aspect ratio does not require vertical black bars; a horizontal black matte at the horizontal edges of the 3D subframes, while the video content aspect ratio does not require horizontal black bars. It is to be noted that the black matte is added to the video data not for correcting any aspect ratio mismatch, but for allowing detecting the black matte for determining the 3D format. Now the black matte is a small black bar of one of more pixels in the video area. It is noted that the matte may be small enough to fall within a border area of the video frame that is usually not displayed, and called the overscan area. The black matte may be applied to the top and bottom edge or to the left and right edge of the video area. Alternatively a black matte may applied only to one side edge, e.g. the edge on which both 3D subframe will be adjacent when located in the 2D frame of the 2D formatted video signal.

In an embodiment the detector 53 is arranged for detecting the vertical black matte at a vertical edge of the 3D subframes, or a horizontal black matte at a horizontal edge of the 3D subframes, as intentionally added in the video signal defined above. Relatively small bars have been included in the video data of the 3D subframes for enhancing the automatic detection of 3D video data which is transferred in the 2D formatted video signal. The detector derives the specific edge area of the 3D subframes that is assumed to contain the black matte according to the respective 3D video format from the video data while taking into account any preprocessing, such as subsampling, prescribed by the respective 3D format at the encoding side.

In an embodiment, the black levels of the black matte could have different values (e.g. 0 and 4) for the left and right 3D subframes. Both values will be substantially black when viewed on a display. This property can be used to further assist the polarity detection.

In an embodiment the processor is arranged for generating a display signal 56 to be transferred via an output interface unit 55 to the display device, e.g. a display signal according to the HDMI standard, see "High Definition Multimedia Interface; Specification Version 1.3a of Nov. 10, 2006" available at http://hdmi.org/manufacturer/specification.aspx. The processor 52 is arranged for generating the image data included in the display signal 56 for display on the display device 60. The display signal may be formatted according to the existing 2D signal format, and the 3D status signal may be provided separately, e.g. via a separate interface to the 3D display device for controlling the 3D video display, i.e. to set the operational mode for correctly rendering the video signal.

In an embodiment the 3D status signal may be embedded in the 3D display signal 56, e.g. in a control signal or control data frame. The output interface unit (55) constitutes transmitting means for transmitting a 3D display signal, the 3D display signal comprising the 3D video content and control data indicative of the 3D status signal. In a practical embodiment the display signal is provided with the 3D signaling according to the HDMI 1.4 standard.

The 3D display device 60 is for displaying 3D image data. The device has an input interface unit 61 for receiving the display signal 56 that may include the 3D video data transferred from the video device 50. The transferred video data is processed in processing unit 62 for displaying on a 3D display 63, for example a dual or lenticular LCD. The display device 60 may be any type of stereoscopic display, also called 3D display, and has a display depth range indicated by arrow 64.

In an embodiment of the 3D display device 60 the processing of the video signal and the detection of 3D and 2D formats is performed in the processor 62 in the display device. The video data is transferred via the display signal 56. The format detection is performed locally in the display device. The processing unit 62 now performs the function of providing the 3D status signal for generating the display signals in either 2D or 3D mode which are directly coupled to the 3D display. The processing means 62 may be arranged for the corresponding functions as described for the processor 52 and/or the detector 53 in the video device.

In an embodiment the video device 50 and the display device 60 are integrated in a single device, where a single set of processing means performs said 2D/3D format detection function. The 3D status signal 57 is provided internally for directly controlling the build-in 3D video display.

FIG. 1 further shows the record carrier 54 as a carrier of the video signal carrying a 3D format. The record carrier is disc-shaped and has a track and a central hole. The track, constituted by a series of physically detectable marks, is arranged in accordance with a spiral or concentric pattern of turns constituting substantially parallel tracks on an information layer. The record carrier may be optically readable, called an optical disc, e.g. a CD, DVD or BD (Blue-ray Disc). The information is represented on the information layer by the optically detectable marks along the track, e.g. pits and lands. The track structure also comprises position information, e.g. headers and addresses, for indication the location of units of information, usually called information blocks. The record carrier 54 carries information representing digitally encoded image data like video, for example encoded according to the MPEG2 or MPEG4 encoding system, in a predefined recording format like the DVD or BD format.

In various embodiments the processor 52 and the detector 53 in the video device are arranged for executing the following functions as described in detail below.

In an embodiment a method provides a video signal, which comprises video data representing either three dimensional video [3D] content formatted according to a 3D format or two dimensional video [2D] content formatted according to a 2D format, the video signal having a 2D frame and a control structure of a 2D format, the 3D format having at least two 3D subframes for constituting a single 3D frame and being one of a set of possible 3D formats, the video data having at least one of
- a vertical black matte at a vertical edge of the 3D subframes, while the video content aspect ratio does not require vertical black bars;
- a horizontal black matte at a horizontal edge of the 3D subframes, while the video content aspect ratio does not require horizontal black bars;

for allowing detecting the black matte for determining the 3D format.

In a further embodiment, the method comprises the step of manufacturing a record carrier, the record carrier being provided with a track of marks representing the video signal.

As a product, a record carrier 54 is provided with a track of marks comprising the above video signal by the above manufacturing method.

Figure 2:
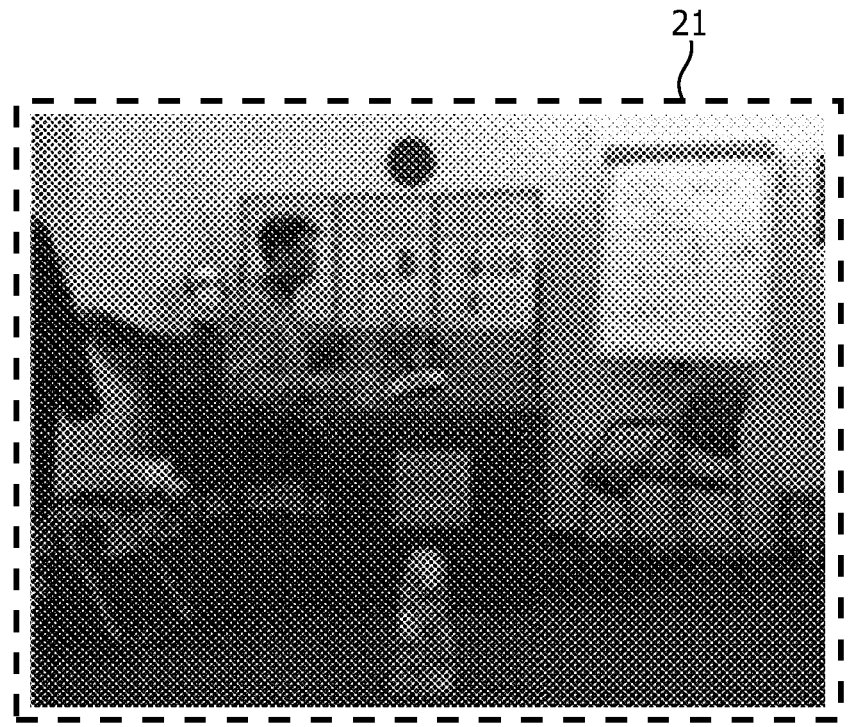
FIG. 2 shows a 2D video frame.

FIG. 2 shows a 2D video frame. The Figure shows an example of 2D video content in a 2D video frame indicated by a dashed line 21. The same video content, but in a 3D form, is also used as an example of 3D formats in the FIGS. 3-5. It is noted that the 2D frame is encoded in a 2D video signal according to one of various known 2D formats. The encoding may include compression according to MPEG2 or MPEG4 as is well known in the art.

Figure 3:
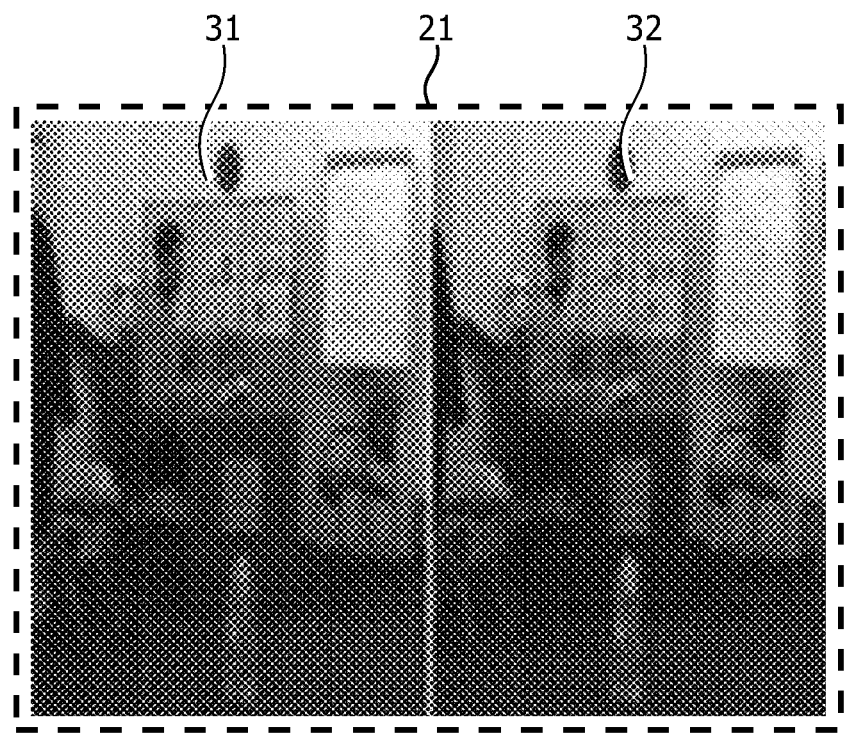
FIG. 3 shows a side-by-side 3D format.

FIG. 3 shows a side-by-side 3D format, further indicated by SBS. The Figure shows an example of 3D video content constituted by a left frame L 31 and a right frame R 32 arranged side by side in the 2D video frame 21.

Figure 4:
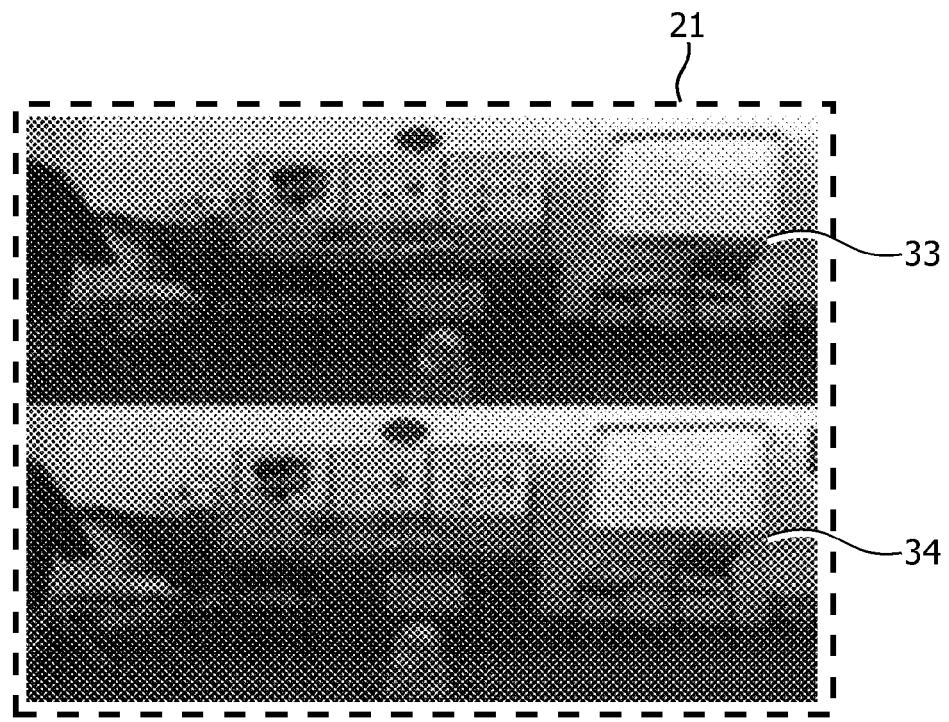
FIG. 4 shows a top-bottom 3D format.

FIG. 4 shows a top-bottom 3D format, further indicated by TB. The Figure shows an example of 3D video content constituted by a left frame L 33 located in the top half of the 2D frame 21 and a right frame R 34 arranged located in the bottom half of the 2D frame 21.

A different 3D format is based on two views using a 2D image and an additional depth image D, a so called depth map, which conveys information about the depth of objects in the 2D image. The format is called image+depth (2D+D) is different in that it is a combination of a 2D image with a so called "depth", or disparity map. This is a gray scale image, whereby the gray scale value of a pixel indicates the amount of disparity (or depth in case of a depth map) for the corresponding pixel in the associated 2D image. The display device uses the disparity, depth or parallax map to calculate the additional views taking the 2D image as input. This may be done in a variety of ways, in the simplest form it is a matter of shifting pixels to the left or right dependent on the disparity value associated to those pixels. It is noted that in the 2D+D format, further depth information may be included like occlusion and/or transparency. The paper entitled "Depth image based rendering, compression and transmission for a new approach on 3D TV" by Christoph Fehn gives an excellent overview of the technology (see http://iphome.hhi.de/fehn/Publications/fehn_EI2004.pdf).

Figure 5:
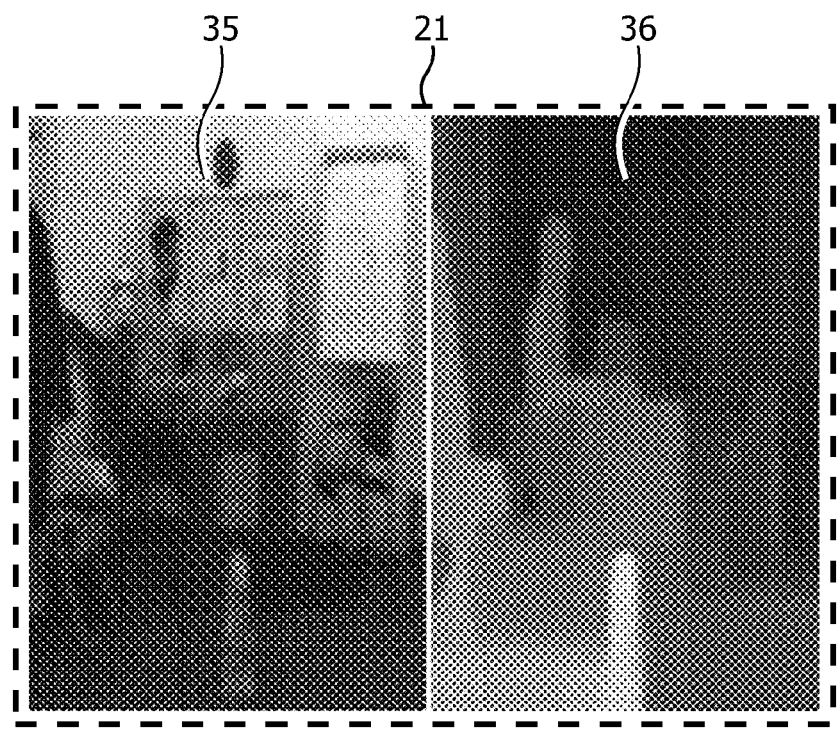
FIG. 5 shows an image and depth 3D format.

FIG. 5 shows an image and depth 3D format, further indicated by 2D+D. The Figure shows an example of 3D video content constituted by a 2D frame 35 and a depth frame D 36 arranged side by side in the 2D video frame 21. The 2D and depth frame may also be arranged in a top/bottom configuration similar to FIG. 4. Further 3D formats arranged in a 2D formatted video signal will be discussed later.

In the following section dealing with the 2D formatted video signal that contains 3D video content according to a 3D format, such as SBS, TB, or 2D+D, will be discussed. The list below shows some further subsampling methods and 3D formats for stereoscopic video.

Line-Interleaved (LI)
Column-Interleaved (CI)
Checkerboard (CB), also called quincunx Checkerboard Side-by-side (CBS), like checkerboard, but storing L & R samples as in SBS for better compression. An example of CB is described in US2005/0117637.

By assuming that a particular 3D format has been used, and comparing the possibilities by making use of techniques such as motion/disparity compensation, correlation, calculation of mean absolute differences (MAD), etc., the actual 3D mode is detected automatically. For the different sampling methods the system below uses a corresponding method for detecting the format. The first step in the method is deriving the 3D subframes from the 2D format signal according to the arrangement and/or interleaving of the respective 3D format. For example, for the LI arrangement, the method reconstructs L and R based on respective lines. Subsequently the alleged 3D subframes are analyzed to determine if the properties are as expected. If so, a 3D status signal is set to indicate the respective 3D format.

Figure 6:
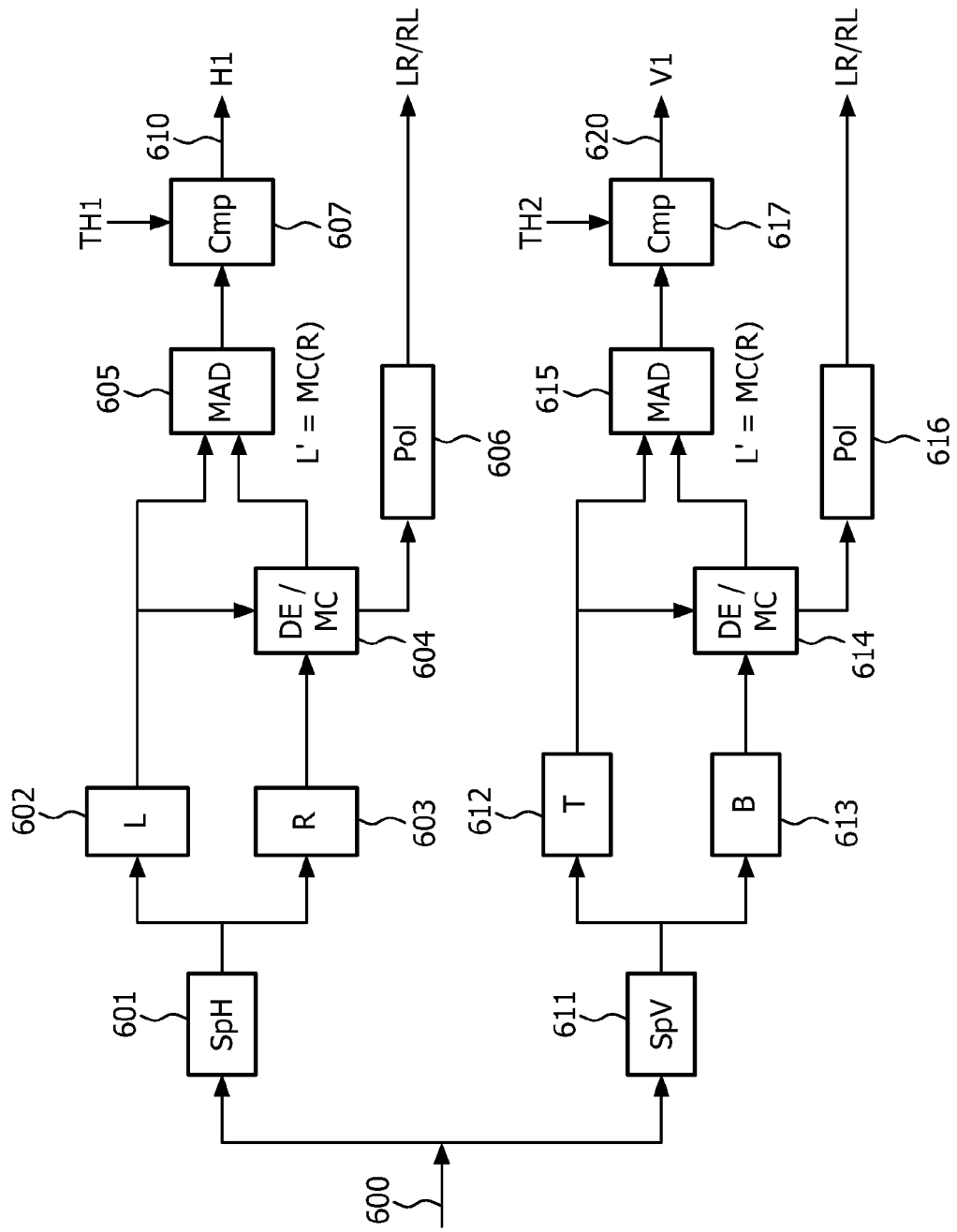
FIG. 6 shows a processor for automatic detection of a 3D format.

FIG. 6 shows a processor for automatic detection of a 3D format. The Figure shows an example embodiment of processor 52 having a parallel arrangement for analyzing 2 possible 3D formats. In the top section of the Figure a video input signal 600 is coupled to a 3D subframe splitting unit SPH 601 for splitting the 2D frame in the input signal into two (or more) 3D subframes according to a first 3D format. In the example, the unit SPH has the function to split the frame horizontally according to a side-by-side (SBS) arrangement of 3D subframes. A memory unit L 602 stores the pixels of the left 3D subframe, and a memory unit R 603 stores the pixels of the right 3D subframe. The L and R units 602,603 may just store the incoming pixels or may upsample the video data to full resolution according to the respective 3D format that is assumed to be used. Better results are to be expected for full resolution based on the upsampling, because the video data at the encoder side were downsampled according to the respective 3D format, e.g. in horizontal, vertical, or quincunx direction, which is now compensated.

Subsequently the 3D subframes are coupled to a comparison section for calculating a correspondence between the 3D subframes. In the embodiment a correspondence calculation unit MAD 605 is provided, which performs calculating mean absolute differences between the 3D subframes. The mean absolute difference of each (or a subset of) corresponding pixels in the 2 parts is calculated. Alternatively, or additionally, other correspondences between the 3D subframes may be estimated, e.g. calculating mean squared differences (MSD), calculating a correlation between the 3D subframes, or calculating color properties of the respective 3D subframes for detecting a depth data subframe of the 2D+D format as shown in FIG. 5. The output of the correspondence calculation is converted in scoring unit CMP 607 to a format score 610 for the SBS 3D format, e.g. by normalizing.

Format scores for different 3D formats are to be assessed to determine the actual 3D format used, if any. The format scores may be compared to each other and/or to respective thresholds. A format score may express a confidence level indicative of the probability that the actual 3D subframes are present according to the respective 3D format. Format scores may be determined repeatedly, e.g. every second, and the multiple measurements and respective confidence levels may be assessed in a weighted evaluation process. The process may be terminated if a preset confidence level has been achieved, and/or after a predetermined interval. The process may involve a majority vote weighed with confidence level, e.g. a high MAD value with small differences between subsequent assumptions for a specific 3D format gives a low confidence for that format. If none of the 3D formats has a sufficient confidence level, a 2D signal (mono video) is assumed. In the practical embodiment shown in FIG. 6, the MAD value must be low, and is tested to be below a certain threshold TH1 in the unit CMP for, if the score is sufficiently reliable, taking a decision that the first 3D format is present at the input, indicated by a value H1 of the format score for the first 3D format.

Since the left and right image are taken from different viewpoints it is better to eliminate this influence as much as possible, which can, for example, be done via Disparity Estimation (DE) and applying "motion/view" compensation (MC) on the R view resulting in L'. It is noted that the technology of motion estimation may be used here on the L and R subframes, i.e. to detect spatial differences instead of temporal differences between two frames. Motion estimation is well known and the known algorithms can be similarly applied for disparity estimation. Other techniques for disparity estimation and view compensation may be used also for determining L'. The comparison section may thereto be provided with a 3D subframe processor DE/MC 604 for reducing the differences between the subframes based on the assumption that the memory units L and R actually contain left and right subframes. Thereto processor DE/MC applies a suitable disparity estimation and/or motion compensation algorithm on the contents of R to generate a compensated frame L' which corresponds to a compensated version of R indicated by L'=MC(R). Subsequently the frame L is compared to frame L' by the correspondence calculation unit MAD.

The processor shown in FIG. 6 has a second section in the parallel arrangement for simultaneously providing a second format score for a second 3D format. In the bottom section of the Figure a video input signal 600 is coupled to a 3D subframe unit SPV 611. The unit SPV has the function of vertically splitting the 2D frame in the input signal according to a top-bottom (TB) arrangement of 3D subframes. A memory unit T 612 stores the pixels of the top section of the frame, e.g. the left 3D subframe, and a memory unit R 613 stores the pixels of bottom section corresponding to the right 3D subframe. Subsequently the 3D subframes are coupled to a comparison section for calculating a correspondence between the 3D subframes. A further correspondence calculation unit MAD 615 is provided equal to the unit 605 described above. The output of the correspondence calculation is converted in a further scoring unit CMP 617, equal to the unit 607 described above, into a format score 620 for the TB 3D format. Optionally the format score may be directly compared to the threshold TH2 in the unit CMP for, if the score is reliable, immediately taking a decision that the second 3D format is present at the input, indicted by a value V1 of the format score for the second 3D format.

The comparison section may be provided with a 3D subframe processor DE/MC 614, equal to the unit 604 described above, for reducing the differences between the subframes, and/or a polarity unit POL 616, equal to the unit 606 described below, for determining a polarity score and generating a second output left/right polarity status signal LR/RL.

The function of the processor is to test for the assumption that the received input format is SBS in the upper branch of the diagram, or that the received input format is TB in the lower branch of the diagram. If both assumptions are false (in the embodiment both H1 and V1 are false) then the input signal is apparently a regular 2D signal.

With respect to the embodiment in FIG. 6 having 2 parallel sections, it is noted that other arrangements can be easily derived, such as further parallel sections to analyze further 3D formats, or a sequential arrangement where the same units are programmed according to different 3D formats sequentially to provide format scores for the respective 3D formats.

In an embodiment having sequential testing of multiple 3D formats, determining respective format scores for a number of 3D formats of the set of possible 3D formats is arranged in a predetermined order, and the 3D status signal is set when the assessment of the format scores provides a predetermined level of confidence. Hence the 3D status signal is set when one of the 3D formats tested sequentially has obtained a reliable format score. The predetermined order may be used to enhance the speed of detecting, and may e.g. be based on a decreasing likelihood of occurrence, a setting by a user, and/ or a setting by a provider of the 3D content. For example, a content provider might set the predetermined order in a set top box based on the actual occurrence of 3D formats.

In an embodiment the user may be offered an option to correct the 3D status signal based on an order of the 3D format scores. First the system determines the most likely format, but, if the result is not correct, the user may cycle to the next likely candidate based on the format scores with a button on the remote control.

In practical embodiments the 3D subframe processor DE/MC 604 may be arranged for pre-processing the respective 3D subframes to enhance comparing as follows:
- calculating a disparity estimation between the 3D subframes and compensating at least one of the 3D subframes based on the disparity estimation before further comparing; and/or
- calculating an auto-correlation of the 2D frame for comparing with a correlation of the 3D subframes. The correlation is determined by unit MAD, and the output of the auto-correlation may be used to set the threshold TH1 as described above.

It is noted, that in practice subsampling may be applied first (i.e. horizontal or vertical or hor/ver decimation) on the contents of L and R, which will reduce the computational complexity of further units, like units DE/MC and MAD.

In an embodiment the specific type of subsampling may be detected also. For example the SBS checkerboard format has a different subsampling from the normal SBS method. Distinguishing SCB from SBS may be based on spectrum analysis whereby the SCB spectrum will be more cross/diamond-shaped (symmetric between vertical and horizontal), the SBS vertical ridge shaped (horizontal high frequencies more suppressed than vertical high frequencies).

In practice, a number of 3D formats may be detected in a different process as follows. An auto correlation for the total 2D frame is calculated (e.g. based on MAD or other technique), and further correlations are subsequently calculated for determining format scores based on some well-chosen offsets such as:
a. One and two pixels to the right (for the CI format)
b. One and two pixels down (for the LI format)
c. Pixel one half-frame to the right (for the SBS format)
d. Pixel one half-frame down (for the TB format)

Secondly the format score values are compared to decide which format (2D,TB,LI,CI,CB) is most likely. Thirdly, 2D+D is separately detected, e.g. by determining a constancy of UN in left/right half or top/bottom half of the image. It is noted that 2D+D could be detected easily because for all the pixels on one half, the UV values of all the pixels would be a fixed value, normally 0 (128). If this is the case for both half's, it is obviously a black and white video source.

In an alternative embodiment, to speed up processing, the MAD or MSD of only the first column of pixels is calculated of the alleged 3D subframes, e.g. using the left and right part for SBS. If they show a high correlation then it is likely that the 3D format is correct. More columns can be included to improve the reliability. An even faster approach is to compare only the average color of the first column of pixels of the left- and right part of the image. If SBS is not detected the system continues by splitting the signal in different parts, for TB the split is done in horizontal direction then again the same algorithm is used for LI the first pixels of the odd and even lines, for CL the columns etc. If none of these results in a positive match then the system reverts to 2D.

It is noted that various possible 3D formats have left and right 3D [L and R] subframes arranged in the 2D frame according to a left/right polarity. The left/right polarity can also be detected automatically for the respective 3D format based on assuming a predetermined distribution of depth in the average video content, e.g. by using disparity estimation, in order to obtain a depth map. By analyzing this depth map, which is based on an assumption of the polarity, it can be verified whether the assumed polarity is correct. When the assumed polarity is correct, the depth at the lower part of the screen should indicate objects close to the viewer and at the upper part should indicate objects furthest from the viewer. It is to be noted that the polarity detection may also be applied independently of automatic detection of the 3D format. For example, when 3D video content is received via a 3D distribution system and the 3D format has corresponding control signals, the polarity detection may be applied to determine of verify the polarity, e.g. to make sure that no errors have been made in storing, processing or transferring the 3D subframes.

Figure 7A:
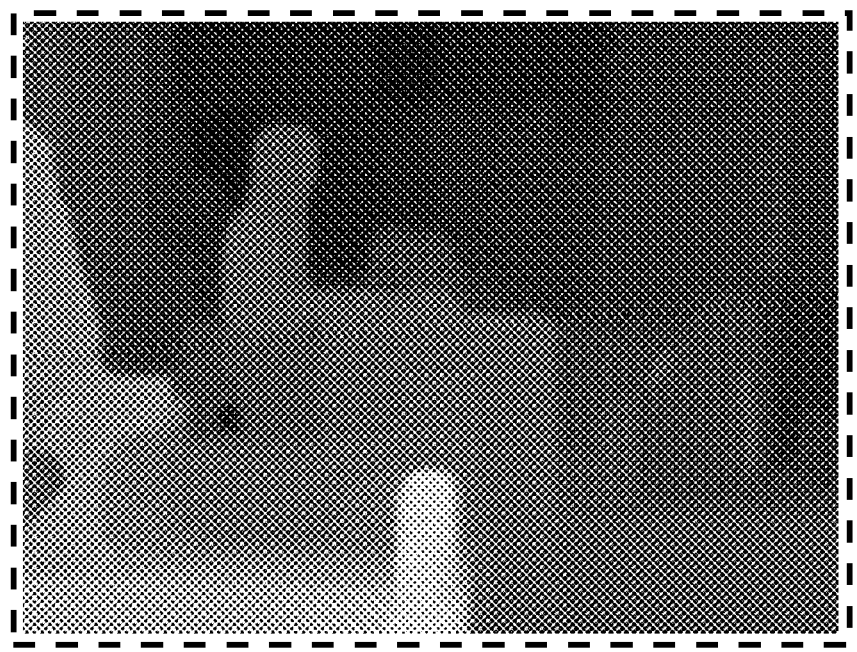
FIG. 7a shows a depth map based on a correct left/right polarity.

FIG. 7*a* shows a depth map based on a correct left/right polarity. In the Figure a depth map is shown having dark pixels indicating a large depth and bright values indicating objects close to the viewer. The depth map may be generated via disparity estimation and converting the disparity into depth values. In practice, for polarity testing, the depth map mat be generated based on heavily subsampled/decimation input frames.

Figure 7B:
FIG. 7b shows a depth map based on a wrong left/right polarity.

FIG. 7*b* shows a depth map based on a wrong left/right polarity. Disparity estimation may be applied to obtain the depth map. By analyzing the depth map it can be verified whether the assumed polarity is correct. When the assumed polarity is correct, the depth values at the low part of the screen should indicate objects close to the viewer and at the upper part should indicate objects furthest from the viewer (as is the case with FIG. 7*a*). When the assumed polarity is wrong, the depth values at the low part of the screen should indicate objects further from the viewer and at the upper part should indicate objects closer to the viewer (as in FIG. 7*b*).

In an embodiment, the processor section is provided with a polarity unit POL 606 for determining a polarity score based on a predetermined distribution of depth occurring in the 3D frame. An output left/right polarity status signal LR/RL is generated for setting the 3D status based on an assessment of the polarity score, e.g. based on a minimum difference between the average depth in the top half of the 3D frame and the average depth in the bottom half of the 3D frame. Depth values in the 3D frame may be directly available in a 2D+D format, or may be derived by the 3D subframe processor DE/MC 604 based on disparity of the L and R 3D subframes.

In a practical embodiment, determining the polarity score is based on, for at least one of the possible polarity arrangements of the 3D subframes, determining whether the depth in the 3D frame increases with vertical height in the frame, or determining whether depth at a vertical edge of a 3D subframe indicates a depth behind the screen, e.g. objects or background. Similarly, determining the polarity score may be based on determining how the disparity values in the 3D frame change with vertical height in the frame or at the edges.

In practice in normal 3D video content out of screen effects are relatively rare and concentrated on small parts of the image. Hence the overall average depth could be calculated as an indicator for polarity. It is noted that depth beyond screen level implies disparity values in a certain horizontal direction, due to the shift between right and left 3D subframes. In a practical embodiment disparity can be used instead of actual depth. Furthermore, disparity can be estimated similarly to motion, i.e. calculating motion vectors between the left and the right image using a well known motion estimation algorithm. Due to the expected depth/disparity distribution, such "motion" vectors would have a preferred horizontal movement direction. The polarity status signal is derived from said direction.

In a further embodiment the polarity unit evaluates the L and R subframe by applying a compression algorithm like MPEG2 and determine which groups (blocks) pixels can be predicatively (P) or bidirectional (B) encoded (which corresponds to having motion vectors) or (I) encoded (which corresponds to having no motion vectors). Actually at certain edges of the 3D subframes the number of I encoded pixels may deviate from the average, which deviation may be used to indicate polarity. Normally more I pixels should be on the left side of the L frame (the part which get cropped on the R frame) and on the right side of the R frame. Hence the number of I encoded pixels at the edges of the 3D subframes is used to decide the left/right polarity. It is noted that the 3D format may also be detected based on I pixels. When I pixels tend to appear on a vertical axis in the center of the 2D frame, this is a strong indication of a SBS 3D signal. When I pixels tend to appear on a horizontal axis in the center of the 2D frame, this is a strong indication of a TB 3D signal.

Figure 8:
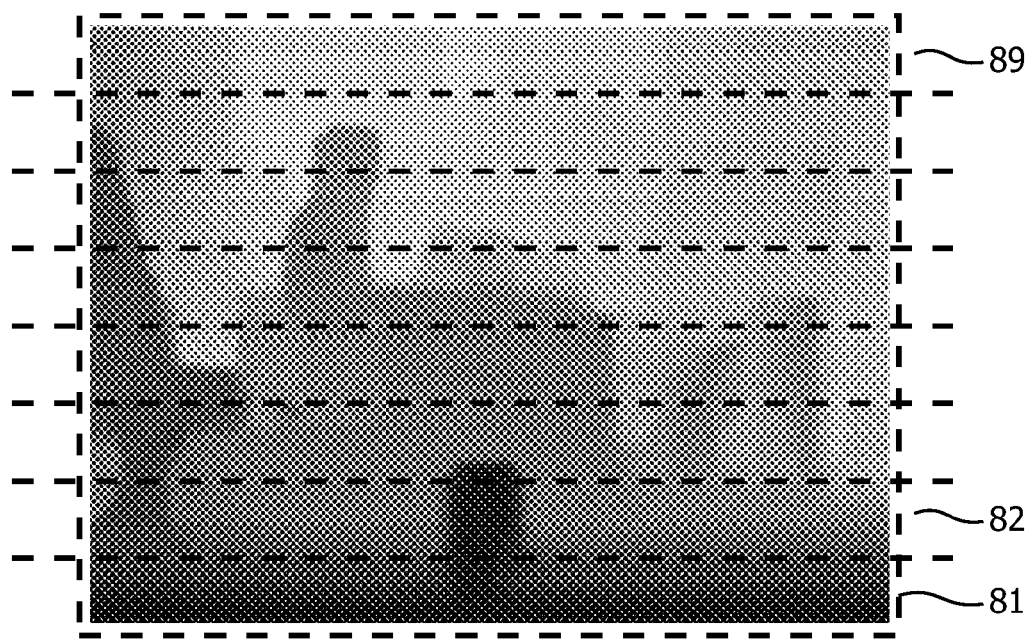
FIG. 8 shows a depth analysis in horizontal fields.

FIG. 8 shows a depth analysis in horizontal fields. The Figure shows a depth map based on an assumed left/right polarity, which is to be tested for correctness. The depth map is subdivided in a number of horizontal fields 81,82,89, also called horizontal bins. By spitting the depth map into horizontal bins, the average depth value in each bin can be calculated. Regression analysis is applied to the average values of the bins to determine whether the low part is darker then the upper part of the other way around, and to determine the polarity.

Figure 9:
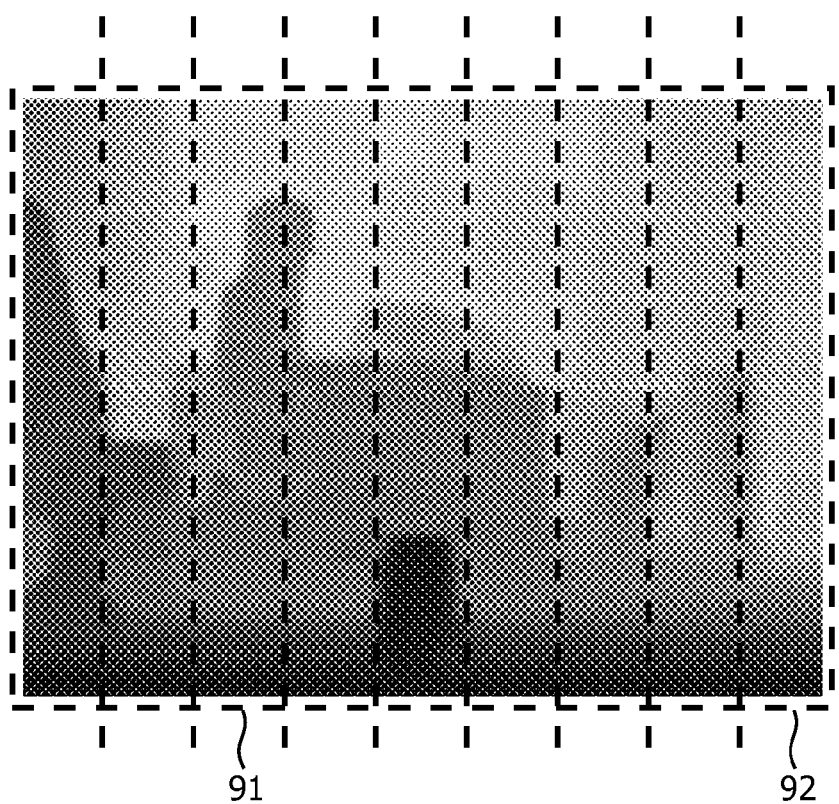
FIG. 9 shows a depth analysis in vertical fields.

FIG. 9 shows a depth analysis in vertical fields. The Figure shows a depth map based on an assumed left/right polarity, which is to be tested for correctness. The depth map is subdivided in a number of vertical fields 91,92, also called vertical bins. By spitting the depth map into vertical bins, on each bin regression analysis can be applied and for each bins to determine whether the low part is darker then the upper part of the other way around. If the majority of the bins correspond with the correct polarity assumption, it can safely be assumed the polarity is correct, otherwise the polarity is inverted. If they are about equal than the outcome of LR analyzing is unsure, and further video input must be analyzed.

Other alternatives for determining the polarity which do not require a depth map are trapezoid detection or edge detection.

Trapezoid detection involves the following steps
Assume 1st frame is L, 2nd frame is R
Do depth or disparity estimation from the L+R frames
If the disparity/depth increases as you move from bottom the assumption is correct, otherwise flip L,R
In a variant, restrict the search area to the top of the (tentative) L and R frames, and check that the disparity/depth is positive
Edge detection involves the following steps
Assume 1st frame is L, 2nd frame is R
Try to match the region next to the right-edge of the screen in the L-frame to right-edge of the R-frame (P-vector determination)
If there is no good match, the assumption is correct, otherwise flip L and R
This procedure can be repeated at the left edge of the frames with L and R reversed. The idea is that at the edges content is behind the screen (or at least there is a floating window next to it), so the R-eye part of an object close to the right screen edge will be obscured, so its L-eye part cannot be matched. Similarly the L-eye part of an object close to the left-edge of the screen In an embodiment, to improve reliability of format and/or polarity detection scene cut detection is applied. Thereto the processor 52 is arranged for detecting scene changes. The 3D format detection is performed multiple times for multiple scenes, and the status signal is finally set based on the format detection in at least two different scenes. Hence determining the respective format score involves detecting a scene change in the video content, and calculating format scores for at least two scenes. In practice 3 scenes may be used, e.g. when calculating 3 subsequent scene decisions for 3 consecutive video parts marked by scene cuts, at least 2 format decisions must be consistent and at most one may be unsure.

A 2D-expansion device may be defined as follows. Video device for processing a video signal, the device comprising receiving means for receiving the video signal comprising video data representing either three dimensional video [3D] content formatted according to a 3D format or two dimensional video [2D] content formatted according to a 2D format, the 3D format having at least two 3D subframes for constituting a single 3D frame, the 2D format having a 2D frame, and the device comprising a processor for detecting presence of said 3D content, and converting the 3D content to a 2D video output signal by retrieving at least one 3D subframe and expanding the subframe to the 2D frame according to the 2D format. The 2D expansion device detects 3D content on the input, and outputs either a 2D or 3D video signal based on required output mode. Advantageously a single 3D transmission signal can be used, for also providing a 2D version of the video content to 2D viewers. Moreover, the 3D content may be transferred in a 2D signal format as explained above to be compatible with existing distribution systems. Due to the 2D expansion function the 2D viewer can still be provided with a 2D video signal.

In an embodiment, the 2D-expansion device is a video device as shown in FIG. 1, having a 2D-expansion function arranged as follows. The processor 52 is arranged for detecting the presence of 3D video content according to a 3D format in the video input signal arriving on the input unit 51. Furthermore, the device is arranged for providing a 2D output signal by converting the 3D video content on the input to the 2D output signal. Thereto a part of the 3D input signal, e.g. a left frame, is expanded to the 2D frame in the 2D output signal, while at the same time removing the original 3D content. Also the 3D control data (if any) may be removed from the signal and replaced by 2D control data.

The 2D output signal may be coupled to a 2D video device to be connected instead of the 3D video device 60, or may be selected by the user to intentionally avoid displaying 3D video. The 2D expansion device may enable the user to select a 2D output mode or a 3D output mode for matching the output signal to the requirements of the user, e.g. to match the equipment that the user intends to connect or has connected. Alternatively, or additionally, the 2D expansion device may be arranged for exchanging control data with a video device coupled to the output unit 55, e.g. according to HDMI as described above. The control data may indicate the 3D capability of a connected display device, and the video device may automatically select the 2D or 3D output mode in accordance with said display capability.

The processor 52 is arranged for converting the 3D video content on the input to the 2D output signal, if required. The conversion is activated based on the presence of 3D video content on the input and the 2D output mode having been set. The processor first determines the 3D format of the input signal. It is to be noted that the 3D format may be automatically detected from the video data as described above, or may be derived from a control signal provided with the input signal.

In an embodiment of the 2D expansion device, a content provider may include a dedicated control signal in the 3D video signal to the 2D expansion device to indicate the presence of 3D content that has to be converted, and/or the specific 3D format of the video signal, e.g. a side-by-side 3D format as shown in FIG. 3. Hence SBS or TB signaling may be included in the video stream. Subsequently, the processor retrieves a 3D subframe, e.g. a left 3D subframe from the left part of the frame in the input video signal according to SBS. The 3D subframe may have a reduced size when compared to the 2D output frame, and hence the video data of the 3D subframe must be expanded to the size of the 2D frame and inserted in the output signal. For SBS the horizontal size must be expanded, while the vertical size (number of lines) may remain the same. Hence the conversion involves generating the new 2D output frame having the required resolution, e. by interpolation of missing pixels, or any suitable form of up-sampling.

In an embodiment of the 2D expansion device no 3D output mode is provided, and the conversion is applied to any 3D video content detected on the input. In practice, such a device would be very suitable for legacy users of 2D video equipment, like ordinary 2D TV sets coupled to a set top box for cable or satellite signals. Such a legacy set top box may be modified into the 2D expansion box by just a software update, which may be possible under the control of the content provider, or by some update process initiated by the user himself Advantageously the content provider does not have to transmit the same content twice, i.e. once in 3D for new users equipped with a new set to box and a 3D display, and separately, on an additional channel, also in 2D. Only a single transmission of the new 3D format signal would be sufficient, because legacy 2D display devices would automatically receive the expanded version from the 2D expansion device, i.e. the modified set top box.

It is to be noted that the 2D expansion device may also contain any of the units and/or functions as described above for automatic detection of the 3D format in a 2D format signal. The 3D status signal provided by the automatic detection now controls the 2D expansion function.

An embodiment is a video device for processing a video signal, the device comprising receiving means for receiving the video signal comprising video data representing either three dimensional video [3D] content formatted according to a 3D format or two dimensional video [2D] content formatted according to a 2D format, the video signal having a 2D frame and a control structure of a 2D format, the 3D format having at least two 3D subframes for constituting a single 3D frame and being one of a set of possible 3D formats, a processor for providing a 3D status signal indicative of the format of the video signal, the processor being arranged for determining a respective format score for at least one of the possible 3D formats by processing the video data according to respective predetermined format properties for deriving and comparing the respective 3D subframes, and setting the 3D status signal based on an assessment of the format score to indicate the format of the video signal.

Optionally, determining the respective format score may comprise calculating a correspondence between the 3D subframes by at least one of
calculating a mean of absolute differences between the 3D subframes;
calculating color properties of the respective 3D subframes for detecting a depth data subframe.

Optionally, determining the respective format score may comprise detecting a scene change in the video content, and calculating a correspondence for at least two scenes.

Optionally, comparing the respective 3D subframes may comprise at least one of
calculating a disparity estimation between the 3D subframes and compensating at least one of the 3D subframes based on the disparity estimation before further comparing;
calculating an auto-correlation of the 2D frame for comparing with a correlation of the 3D subframes.

Optionally, wherein at least one of the possible 3D formats comprises left and right 3D [L and R] subframes arranged in the 2D frame according to a left/right polarity, the processor may be arranged for, when determining the format score, determining a polarity score based on a predetermined distribution of depth occurring in the 3D frame, and setting the 3D status includes setting a left/right polarity status signal based on an assessment of the polarity score.

Optionally, the processor may have detector means for comparing the respective 3D subframes by detecting at least one of
a vertical black matte at a vertical edge of the 3D subframes;
a horizontal black matte at a horizontal edge of the 3D subframes.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. Video device for processing a video signal, the device comprising:
    an input/interface unit to receive the video signal comprising video data representing either three dimensional video (3D) content formatted according to a 3D format or two dimensional video (3D) content formatted according to a 2D format, the video signal having a 2D frame and a control structure of a 2D format, the 3D format having at least two 3D subframes for constituting a single 3D frame and being one of a set of possible 3D formats,
    a processor for providing a 3D status signal indicative of the format of the video signal, the processor being arranged for determining respective format scores for a number of the possible 3D formats by processing the video data according to respective predetermined format properties for deriving and comparing the respective 3D subframes, which determining said respective format scores for said number of the possible 3D formats is arranged in a predetermined order, setting the 3D status signal based on an assessment of the respective format scores to indicate the format of the video signal, when the assessment of the format scores provides a predetermined level of confidence, and wherein at least one of the possible 3D formats comprises left and right 3D (L and R) subframes arranged in the 2D frame according to a left/right polarity, and the processor is arranged for, when determining the format score, determining a polarity score based on a predetermined distribution of depth occurring in the 3D frame, and setting the 3D status includes setting a left/right polarity status signal based on an assessment of the polarity score.

2. Video device as claimed in claim 1, wherein the set of possible 3D formats comprises at least one spatial subsampling format for generating the 3D subframes and the predetermined format properties comprises arranging subsampled picture elements of the 3D subframes in the 2D frame of the video signal.

3. Video device as claimed in claim 1, wherein the set of possible 3D formats comprises at least one of
    a side-by-side format (SBS) having the 3D subframes arranged side by side in a 2D frame;
    a top-bottom format (TB) having the 3D subframes arranged in a top part and a bottom part of a 2D frame;
    a line interleaved format (LI) having the 3D subframes arranged by interleaving lines of the 3D subframes in a 2D frame;
    a column-interleaved format (CI) having the 3D subframes arranged by interleaving columns of the 3D subframes in a 2D frame;
    a checkerboard-interleaved format (CB) having the 3D subframes arranged by subsampling pixels of the 3D subframes in a checkerboard pattern and interleaving the subsampled pixels in a checkerboard pattern in a 2D frame;
    a checkerboard-side-by-side format (CBS) having the 3D subframes arranged by subsampling pixels of the 3D subframes in a checkerboard pattern and arranging the subsampled pixels in the 3D subframes side by side in a 2D frame;
    a 2D-depth format (2D+D) having a 2D subframe and a depth data subframe as the 3D subframes arranged in a 2D frame;
    and the processor is arranged to derive the 3D subframes from the video signal for the respective 3D format.

4. Video device as claimed in claim 1, wherein the predetermined order is based on at least one of:
    a decreasing likelihood of occurrence;
    a setting by a user;
    a setting by a provider of the 3D content.

5. Video device as claimed in claim 1, wherein determining the respective format score comprises calculating a correspondence between the 3D subframes by at least one of,
    calculating a correlation between the 3D subframes;
    calculating a mean of absolute differences between the 3D subframes;
    calculating color properties of the respective 3D subframes for detecting a depth data subframe.

6. Video device as claimed in claim 1, wherein determining the respective format score comprises detecting a scene change in the video content, and calculating a correspondence for at least two scenes.

7. Video device as claimed in claim 1, wherein comparing the respective 3D subframes comprises at least one of
    calculating a disparity estimation between the 3D subframes and compensating at least one of the 3D subframes based on the disparity estimation before further comparing;
    calculating an auto-correlation of the 2D frame for comparing with a correlation of the 3D subframes.

8. Video device as claimed in claim 1, wherein determining the polarity score comprises, for at least one of the possible polarity arrangements of the 3D subframes,
    determine whether the depth in the 3D frame increases with vertical height in the frame;
    determine whether the depth at a vertical edge of a 3D subframe indicates a depth behind the screen.

9. Video device as claimed in claim 1, wherein the device comprises at least one of
    a transmitter to transmit for transmitting a 3D display signal, the 3D display signal comprising the 3D video content and control data indicative of the 3D status signal;
    in the input/interface unit, reading a record carrier for receiving the video signal;
    a 3D display for rendering a 3D video signal based on the 3D status signal.

10. Video device as claimed in claim 1, wherein the processor has detector means for comparing the respective 3D subframes by detecting at least one of a vertical black matte at a vertical edge of the 3D subframes;

a horizontal black matte at a horizontal edge of the 3D subframes.

11. Video signal processing system, comprising the video device as claimed in claim 10, and a video signal comprising video data representing either three dimensional video (3D) content formatted according to a 3D format or two dimensional video (2D) content formatted according to a 2D format, the video signal having a 2D frame and a control structure of a 2D format, the 3D format having at least two 3D subframes for constituting a single 3D frame and being one of a set of possible 3D formats, the video data having at least one of a vertical black matte at the vertical edges of the 3D subframes, while the video content aspect ratio does not require vertical black bars;

a horizontal black matte at the horizontal edges of the 3D subframes, while the video content aspect ratio does not require horizontal black bars;

for allowing detecting the black matte for determining the 3D format.

12. Method of processing a video signal, the method comprising receiving the video signal comprising video data representing either three dimensional video (3D) content formatted according to a 3D format or two dimensional video (2D) content formatted according to a 2D format, the video signal having a 2D frame and a control structure of a 2D format, the 3D format having at least two 3D subframes for constituting a single 3D frame and being one of a set of possible 3D formats, providing a 3D status indicative of the format of the video signal based on determining respective format scores for a number of the possible 3D formats by processing the video data according to respective predetermined format properties for deriving and comparing the respective 3D subframes, which determining said respective format scores for said number of the possible 3D formats is arranged in a predetermined order, setting the 3D status based on an assessment of the respective format scores to indicate the format of the video signal, when the assessment of the format scores provides a predetermined level of confidence, and wherein at least one of the possible 3D formats comprises left and right 3D (L and R) subframes arranged in the 2D frame according to a left/right polarity, and the processor is arranged for, when determining the format score, determining a polarity score based on a predetermined distribution of depth occurring in the 3D frame, and setting the 3D status includes setting a left/right polarity status signal based on an assessment of the polarity score.

13. Computer program product for processing a video signal, which program is operative to cause a processor to perform the respective steps of the method as claimed in claim 12.

* * * * *